(12) United States Patent
Aldred et al.

(10) Patent No.: US 6,438,549 B1
(45) Date of Patent: Aug. 20, 2002

(54) METHOD FOR STORING SPARSE HIERARCHICAL DATA IN A RELATIONAL DATABASE

(75) Inventors: Barry Keith Aldred, Hampshire (GB); Debora Jean Byrne; Shaw-Ben Shi, both of Austin, TX (US); Ellen J. Stokes, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,920

(22) Filed: Dec. 3, 1998

(51) Int. Cl.⁷ ............................................. G06F 17/30
(52) U.S. Cl. .................... 707/9; 707/103; 707/102; 707/2
(58) Field of Search .................. 707/2, 3, 5, 9, 707/103, 4, 102

(56) References Cited

U.S. PATENT DOCUMENTS

| | | | | |
|---|---|---|---|---|
| 5,604,899 A | * | 2/1997 | Doktor | 707/3 |
| 5,701,458 A | * | 12/1997 | Bsaibes et al. | 707/9 |
| 5,826,259 A | * | 10/1998 | Doktor | 707/4 |
| 5,918,228 A | * | 6/1999 | Rich et al. | 707/10 |
| 5,983,234 A | * | 11/1999 | Tietjen et al. | 707/103 |
| 6,012,050 A | * | 1/2000 | Eaton et al. | 705/42 |
| 6,085,188 A | * | 7/2000 | Bachmann et al. | 707/3 |
| 6,199,062 B1 | * | 3/2001 | Byrne et al. | 707/3 |
| 6,202,066 B1 | * | 3/2001 | Barkley et al. | 707/9 |
| 6,209,036 B1 | * | 3/2001 | Aldred et al. | 709/229 |
| 6,286,010 B1 | * | 9/2001 | Ramachandran et al. | 707/103 |
| 6,308,181 B1 | * | 10/2001 | Jarvis | 707/102 |
| 6,339,827 B1 | * | 1/2002 | Stokes et al. | 713/176 |
| 6,347,312 B1 | * | 2/2002 | Byrne et al. | 707/3 |
| 6,356,892 B1 | * | 3/2002 | Corn et al. | 707/3 |

* cited by examiner

Primary Examiner—Charles L. Rones
(74) Attorney, Agent, or Firm—Winstead Sechrest & Minick P.C.; Jeffrey S. LaBaw (57) ABSTRACT

A method for securing sparse access control list (ACL) data in a relational database used as a backing store for a hierarchical-based directory service. The sparse ACL data is secured in a plurality of tables. An owner table stores data objects with explicitly set ACLs. A propagation table stores data on whether individual ACLs are inherited by descendant objects. A permissions table stores data regarding permissions which a user may perform on an object. A source table stores data for a set of ancestor objects having respective ACLs for each of a set of descendant objects. Preferably, the tables are stored in the relational database together with the objects. For a given object, data in the tables is used to determine the given object's entry owner and ACL. The inventive technique has particular applicability in a Lightweight Directory Access Protocol (LDAP) directory service having a relational database as a backing store.

14 Claims, 2 Drawing Sheets

METHOD FOR STORING SPARSE HIERARCHICAL DATA IN A RELATIONAL DATABASE

BACKGROUND OF THE INVENTION

1. Technical Field

This invention relates generally to providing directory services in a distributed computing environment and, in particular, to storing sparse hierarchical access control list (ACL) data in a relational database.

2. Description of the Related Art

A directory service is the central point where network services, security services and applications can form a integrated distributed computing environment. The current use of a directory services may be classified into several categories. A "naming service" (e.g., DNS and DCE Cell Directory Service (CDS)) uses the directory as a source to locate an Internet host address or the location of a given server. A "user registry" (e.g., Novell NDS) stores information of all users in a system composed of a number of interconnected machine. The central repository of user information enables a system administrator to administer the distributed system as a single system image.

With more applications and system services demanding a central information repository, the next generation directory service will need to provide system administrators with a data repository that can significantly ease administrative burdens. In addition, the future directory service must also provide end users with a rich information data warehouse that allows them to access department or company employee data, as well as resource information, such as name and location of printers, copy machines, and other environment resources. In the Internet/intranet environment, it will be required to provide user access to such information in a secure manner.

To this end, the Lightweight Directory Access Protocol (LDAP) has emerged as an IETF open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model in particular is based on an "entry," which contains information about some object. Entries are typically organized in a specified tree structure, and each entry is composed of attributes. The directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root.

LDAP provides the capability for directory information to be efficiently queried or updated. It offers a rich set of searching capabilities with which users can put together complex queries to get desired information from a backing store. Increasingly, it has become desirable to use a relational database for storing LDAP directory data. Representative database implementations include DB/2, Oracle, Sybase, Informix and the like. As is well known, Structured Query Language (SQL) is the standard language used to access such databases.

Security for the information kept within the LDAP directory is provided through ACLs (Access Control Lists). The ACL contains the information about what distinguished names have permission to perform particular actions on an entry. The model breaks this information into two pieces: the entry owner, and the ACL entry. While the owner and the ACL are distinct, their behavior conceptually follows similar logic.

The ACL model requirements further specify that every entry must have an owner and at least one ACL. However, in the interest of usability, it is known in the art that an administrator does not have to set an ACL and an owner on every entry. This leads to a so-called sparse ACL model. If an ACL (owner) is not explicitly set on a particular entry, its value is inherited from an ancestor node within the directory. Given that the LDAP directory is hierarchical, this inheritance property means that an administrator may put an ACL (owner) at strategic points within the tree and have that ACL propagate to all entries below that point. Additionally, all changes to the ACL will also propagate. In this scheme, propagation of an ACL value continues until another propagating value is reached.

Although the entry owner and the ACL entry are both concepts within the known ACL model, they are not directly related. Because the ACL and owner are distinct, an entry with an owner specified may or may not have an explicit ACL. Similarly, an entry with an explicitly set ACL may or may not have an explicitly set owner.

To maintain the integrity of the sparse, hierarchical ACL data, it would be desirable to store such data in the database along with the information it protects. In the past, such data has been stored in an editable flat file. As is well-known, however, it is quite difficult to manage hierarchical data within a relational database. It is even more challenging to handle sparse hierarchical information, like ACLs, within relational tables. Storing the ACL and owner information with the entry is not feasible. It defeats some of the benefits of a sparse model because the space and processing requirements are burdensome.

BRIEF SUMMARY OF THE INVENTION

The present invention solves the problem of efficiently storing sparse, hierarchical information in a relational database. The particular invention is particularly useful for storing ACL data in a relational database used as a backing store to a Lightweight Directory Access Protocol (LDAP) directory service.

The ACL data is stored in the relational database using a plurality of tables. A first table, the owner table, contains owner information. The second table, the propagation table, contains propagation data. The third table, the permissions table, contains the ACL information. Thus, three separate tables are created and used to store two sets (ACL and owner) of related, but distinct sparse data. Because there can only be one entry owner DN per object, only one table is needed for the owner data. Likewise, because there can be multiple ACL entries per object, the propagation information is supported in its own table. Updates to propagation information therefore do not require excessive updates to multiple rows within the ACL entry table. Information is selectively pulled from these tables whenever an operation is requested.

In particular, the first, second and third tables are used to determine an entry owner and ACL for a given object. In one preferred method, a SELECT operation is performed based on an identifier of the object. If an ACL or owner is found, that value is kept. If, however, either the ACL or owner is not determined, the parent is checked. If the needed value is then found, a propagation flag is checked. If the propagation flag is TRUE, that value is kept. If the propagation flag is FALSE, then processing continues recursively until both an owner and an ACL value have been found. If the top of the tree (the suffix) has been reached without locating a propagating value, then system defaults are returned.

While this processing produces the desired results, search speed is enhanced significantly by implementing a fourth table, a source table. This table keeps track of the actual entry that holds the owner information (the owner source) and the entry that holds the ACL information (the ACL information) for each object within the directory. For a given object, the first, second, third and fourth tables are used to find the ACL and owner information using only a single SQL call. Use of this table provides the added advantage of avoiding ACL propagation when an explicit ACL or owner information is modified.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
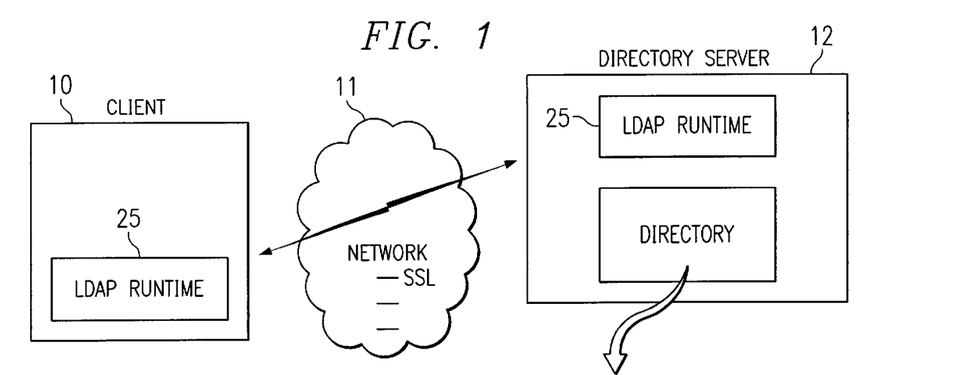
FIG. 1 is a representative LDAP directory service implementation.
Figure 2:
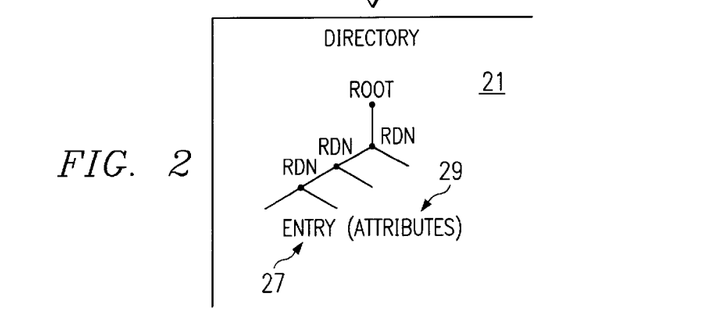
FIG. 2 is a simplified LDAP directory.

The present invention is preferably implemented in an LDAP directory service having a relational database as a backing store. By way of brief background, a block diagram of a representative LDAP directory service in which the present invention may be implemented is shown in FIG. 1. As is well-known, LDAP is the lightweight directory access protocol, and this protocol has been implemented in the prior art, e.g., as either a front end to the X.500 directory service, or as a standalone directory service. According to the protocol, a client machine 10 makes a TCP/IP connection over network 11 to an LDAP server 12, sends requests and receives responses. LDAP server 12 supports a directory 21 as illustrated in a simplified form in FIG. 2. Each of the client and server machines further include a directory "runtime" component 25 for implementing the directory service operations as will be described below. The directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII characters, .jpeg file, etc.) and how these values are constrained during a particular directory operation.

As discussed above, the directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root. The LDAP search can be applied to a single entry (a base level search), an entry's children (a one level search), or an entire subtree (a subtree search). Thus, the "scope" supported by LDAP search are: base, one level and subtree.

Figure 3:
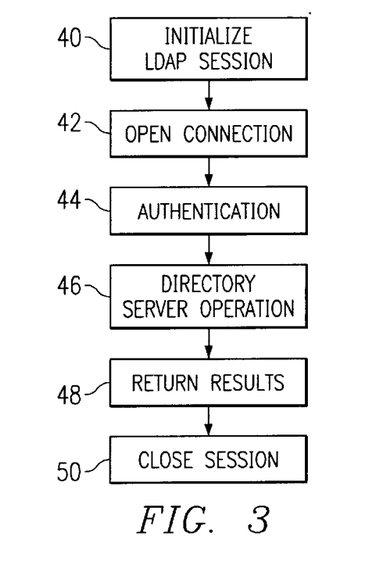
FIG. 3 is a flowchart of an LDAP directory session.

LDAP includes an application programming interface (API), as described in "The C LDAP Application Program Interface", IETF Task Force Working Draft, Jul. 29, 1997, which is incorporated herein by reference. An application on a given client machine uses the LDAP API to effect a directory service "session" according to the flowchart of FIG. 3. At step 40, an LDAP session with a default LDAP server is initialized. At step 42, an API function ldap_init( ) returns a handle to the client, and this handle allows multiple connections to be open at one time. At step 44, the client authenticates to the LDAP server using, for example, an API ldap_bind( ) function. At step 46, one or more LDAP operations are performed. For example, the API function ldap_search( ) may be used to perform a given directory search. At step 48, the LDAP server returns the results. The session is then closed at step 50 with the API ldap_unbind( ) function then being used to close the connection.

Figure 4:
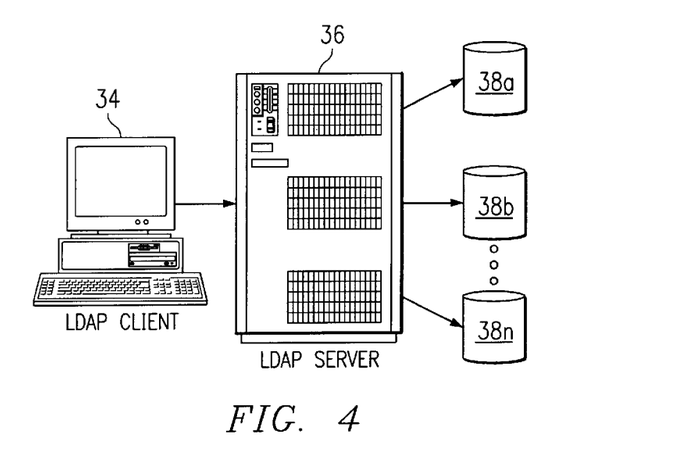
FIG. 4 shows a representative LDAP directory service implementation having relational database backing store.

It is desired to store LDAP directory data in a backing store. FIGS. 4 illustrates a representative LDAP directory service implementations that use a relational database management system (RDBMS) for this purpose. This system merely illustrates a possible LDAP directory services in which the present invention may be implemented. One of ordinary skill should appreciate, however, that the invention is not limited to an LDAP directory service provided with a DB/2 backing store. The principles of the present invention may be practiced in other types of directory services (e.g., X.500) and using other relational database management systems (e.g., Oracle, Sybase, Informix, and the like) as the backing store.

In FIG. 4, an LDAP client 34 can connect to a number of networked databases 38a–58n through an LDAP server 36. The databases 38a–38n contain the directory information. However, from the user's perspective, the LDAP server 36 actually stores all the information without knowing the database 38 in which the data is actually located. With this configuration, the LDAP server 36 is freed from managing the physical data storage and is able to retrieve information from multiple database servers 38 which work together to form a huge data storage.

One of ordinary skill should appreciate that the system architectures illustrated in FIG. 4 is not to be taken as limiting the present invention.

As discussed above, security for the information kept within the LDAP directory is provided through ACLs (Access Control Lists). The ACL contains the information about what distinguished names have permission to perform particular actions on an entry. This information includes two pieces: the entry owner, and the ACL entry. Every entry must have an owner and at least one ACL. However, an ACL and an owner need not be set for every entry. This is a sparse ACL model. If an ACL (owner) is not explicitly set on a particular entry, its value is inherited from an ancestor node within the directory. Given that the LDAP directory is hierarchical, this inheritance property means that an administrator may put an ACL (owner) at strategic points within the tree and have that ACL propagate to all entries below that point. Additionally, all changes to the ACL will also propagate. In this scheme, propagation of an ACL value continues until another propagating value is reached.

Figures 5, 6, 7:
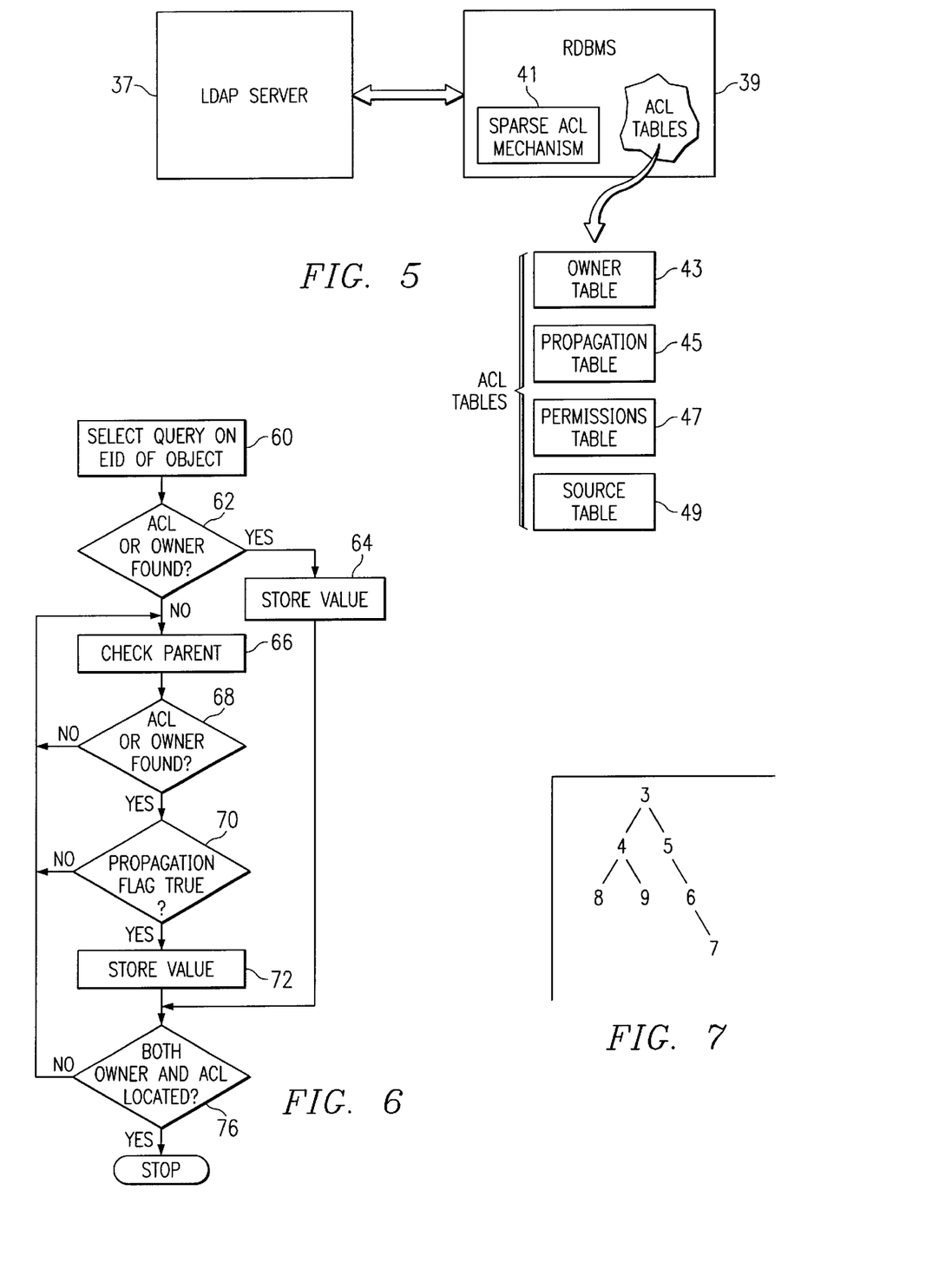
FIG. 5 is a simplified block diagram of the table structures used to implement storage of sparse, hierarchical ACL data according to the present invention.
FIG. 6 is a flowchart illustrating a representative software routine for retrieving an object's ACL and owner.
FIG. 7 is a representation of a hierarchical directory tree corresponding to an exemplary source table.

With reference now to FIG. 5, a block diagram of the present invention is illustrated. In particular, the invention provides a novel and efficient mechanism for storing and processing sparse ACL information in a relational database management system (RDBMS) 39. Relational database is used as a backing store for an LDAP server 37. According to the invention, RDBMS 39 includes a sparse access control list (ACL) mechanism 41 as known in the art. ACL information is stored in a plurality of tables located within the backing store. These tables include an owner table 43, a propagation table 45, a permissions table 47, and a source table 49. As will be illustrated in more detail below, the owner table 43 stores data on objects with explicitly set ACLs, the propagation table 45 stores data on whether individual ACLs are inherited by descendant objects, the permissions table 47 stores data regarding permissions which a user may perform on an object, and the source table 49 stores data for a set of ancestor objects having respective ACLs for each of a set of descendant objects. The actual data stored in these tables and the relationship of the tables will now be described in detail.

By way of brief background, in conformance with the LDAP model, the access control-related properties of an entry are represented as attribute * value pairs. Furthermore, a known syntax may be used to administer these values. Based on the ACL model, five ACL related attributes are considered a part of every directory entry. These include: entryOwner, ownerPropagate, inheritOnCreate, aclEntry and entryPropagate. The entryOwner attribute consists of a user or group DN that is given full authority on that entry. This DN is considered the administrator for that distinguished name. The ownerPropagate attribute indicates if this DN value should propagate to child entries that do not have an owner explicitly set. The inheritOnCreate attribute is a security feature that controls the ACL values at object creation time. If inheritOnCreate is TRUE, the child object must inherit all ACL and owner values from its parent (or first propagating ancestor). If inheritOnCreate is false, ACL values may be specified at object creation time. After the object has been created, the attributes may be administered as normal. The aclEntry attribute describes the user and group distinguished names that have been given privileges to perform particular operations on that entry.

The owner table (own) 43 contains information for every explicitly set owner in the database. If an object has an explicit owner, it will have a row in the owner table. A representative owner table (own) is set forth below (Table I):

TABLE I

| Object (uid) | entryOwn-er(dn) | entryType (user/group)(dtp) | ownerPropa-gate (prp) | inheritOnCreate |
|---|---|---|---|---|
| (value) | (value) | (value) | (value) | (value) |

As noted above, the propagation table 45 describes whether an ACL value applies to descendants of this entry. Any ACL which has been explicitly set has a propagation value of TRUE or FALSE. Each explicitly set ACL will have an entry in the ACL propagation table (acl). A representative propagation table (acl) is set forth below (Table II):

TABLE II

| Object (uid) | ACL Propagation flag |
|---|---|
| (value) | (value) |

The aclEntry attribute describes the user and group distinguished names that have been given privileges to perform particular operations on that entry. This information is stored in the permissions table (cpt) 47. A representative class permissions table is set forth below (Table III):

TABLE III

| Object (uid) | DN | DN Type | Attribute Class | Permissions Granted To Attribute Class |
|---|---|---|---|---|
| (Value) | (Value) | (Value) | (Value) | (Values) |

As can be seen, this table stores information about what permissions a particular user is granted for an attribute class. According to the model, all LDAP user-modifiable attributes belong to one of three attribute classes: normal, sensitive, or critical. Permissions are set with regard to the attribute class as a whole. The permissions set on a particular attribute class apply to all attributes within that class. Attributes are assigned to their respective classes in a configuration file. The possible attribute class permissions are: read(r), write (w), search(s) and compare(c). Additionally, object permissions preferably apply to the entry as a whole. These permissions are add child entries (a) and delete this entry (d).

The permissions table 47 preferably contains one row for each class permission of each distinguished name within the ACL. For example, if an entry specified that DN: cn=personA, ou=deptXYZ, o=IBM,c=US has (ad) permission on the object, (rwsc) permissions on normal and sensitive attribute classes and (rsc) on critical attributes, four rows would be created within the class permissions table. All rows would be for DN or personA, with one row for object permissions, one for normal attribute class permissions, one for sensitive permissions and one for critical permissions.

As also discussed above, the source table (src) 49 keeps track of the actual entry that holds the owner information (the owner source) and the entry that holds the ACL information (the ACL information) for each object within the directory. A representative source table is set forth below (Table IV):

TABLE IV

| Object (uid) | Object ID (ACL Source) | Object ID (Owner Source) |
|---|---|---|
| (Value) | (Value) | (Value) |

Table Creation:

Upon initialization, the ACL tables are created and initialized to the system default. This ensures that there will be an ACL that can be propagated to all entries should the user choose not to set an ACL. The system default preferably is stored in the tables used an object eid of −1. This is an invalid object eid and, therefore, it is assured that the default cannot be overwritten. The system default ACL is set to propagate. A current administrator is considered the entry owner, and the owner properties are also set to propagating. The InheritOnCreate attribute is set to true for security purposes. Additionally, all users are given read, search and compare permissions on the normal attribute class. After successful initialization the first (own), second (acl) and third (cpt) tables look at follows:

OWN TABLE

| Object (uid) | entryOwner(dn) | entryType (user/group)(dtp) | ownerPropagate (prp) | inheritOnCreate |
|---|---|---|---|---|
| −1 | " " | 2 | 1 | 1 |

ACL TABLE

| Object (uid) | ACL Propagation flag |
|---|---|
| −1 | 1 |

CPT TABLE

| Object (uid) | DN | DN Type | Attribute Class | Permissions Granted To Attribute Class |
|---|---|---|---|---|
| −1 | cn=Anybody | 1 | 1 | 3 |

Note that in the owner table, "." is translated into the current administrator DN. Also, in the permissions table, "cn=Anybody" is considered to be the group of all unauthenticated users, or any user that does not have a specific ACL set or does not belong to a group with a specified ACL set. As illustrated above, it is preferred to use integer types are the preferred table values when possible to allow a faster response time by the database. The following definitions are preferred:

Propagate Values:
  TRUE: 1 FALSE: 0
  DnTypes: ACL_GROUP: dnType 2 ACL_USER: dnType 1
Attribute Classes:
  NORMAL 1 SENSITIVE 2 CRITICAL 4 RESTRICTED 8 SYSTEM 16 OBJECT 32
Permissions:
  ACL_READ: 1 ACL_WRITE: 2 ACL_SEARCH: 4 ACL_COMPARE: 8 ACL_ADD: 16 ACL_DELETE: 32
Granting Access Access for a particular operation is granted or denied based on the bind DN for that operation. Processing stops as soon as access has been determined. If the bind DN matches the administrator DN, permission is granted. If the bind DN matches the entryOwner DN, access is granted. If the bind DN is neither of these, the class permissions are evaluated.

Adding ACL/Owner Values To The Tables:

When receiving the ACL entry, the value is typically in a string format, such as: accessid:cn=personA,o=IBM,c=US:normal:rwsc:sensitive:rsc:object:a. This information is parsed into the component parts described above, namely: dnType, dn, [class:permissions]*. The resulting values are then inserted into the class permissions table, for example, by using the SQL query "INSERT into cpt (din, dtp, pma, uid, atc) VALUES (?, ?, ?, ?)". In an illustrative example, if the object uid is 4, the resulting table has an additional 3 lines.

When adding an ACL, a row must be added to the propagation table to record if this ACL applies to this entry or to all entries. If the ACL value has not been specified, the ACL propagation flag will default to "TRUE" Thus, the following SQL query "INSERT into ACL (prp, uid) VALUES (?, ?)" may be used to insert the propagation values into the ACL table.

If there are any owner values, these values must also be inserted into the owner table. This can be accomplished, for example, using the query "INSERT into own (din, dtp, uid, prp, ioc) VALUES (?, ?, ?,?)". The DNtype and DN are provided in the entryOwner attribute. If the propagation attribute has not been specified, the value defaults to TRUE. Similarly, if the inheritOnCreate value is specified, the value defaults to TRUE.

Adding an Object

To add an object, the user must have "a" permission on the parent. The parent's owner and ACL are first retrieved and are checked for access. Next, if the object has either owner or ACL attributes that are to be placed on the object, the ACLs which the object inherits are determined. If the inheritOnCreate attribute flag is set to TRUE, the new ACL attributes are not accepted. Otherwise, if the flag is set to FALSE, the new values are accepted and added to the appropriate tables.

Deleting an Object:

To delete an object, the user must have "d" permission on that object. The ACL information is retrieved and access is verified. Additionally, all references to that DN are removed from the tables. All rows containing that DN within the permissions table are updated. This can be accomplished, for example, using the query "UPDATE cpt SET din=" ", pma=0, atc=0, dtp=2 WHERE din LIKE ?" and "UPDATE own SET din=" "WHERE din LIKE?". This statement reverts any ownership by that DN back to the administrator DN. If the object has an ACL or owner value set, such values preferably are removed from the tables, for example, by using the query "DELETE FROM % s WHERE uid=?", where % s is filled in with values from the permissions table, the propagation table and the owner table (preferably in three separate calls to the database).

Performing a ModRDN:

When modifying the name of a distinguished name, the modification is preferably done within the ACL tables. This may be accomplished, for example, using the query: "UPDATE % s SET din=? WHERE din LIKE?", where % s refers either to the owner table or the propagation table. This operation ensures that the ACL tables remain consistent with the new value in the rest of the database.

Changing an ACL:

Updates to a particular ACL are accomplished by removing the ACL or owner record from the table and then re-adding it with the new values.

Using the LDAP/DB2 ACL Tables:

The above-illustrated tables are useful in retrieving an object's ACL and owner. An illustrated routine for accomplishing this is illustrated in FIG. 6. The routine begins at step 60 with a SELECT query done based on the eid of the object. Given the DB/2 nomenclature identified above, a preferred query used to retrieve the information is: "SELECT own.prp, ioc, own.din, own.dtp, acl.prp, cpt,din, cpt.dtp, atc, pma, own.uid, cpt,uid FROM own, cpt, ACL WHERE own.uid=? and cpt.uid=?". A test is then performed at step 62 to determine if an ACL or owner is found. If the result of the test at step 62 is positive, that value is kept at step 64 (and the routine continues at step 76). If neither the ACL nor owner has been determined, the routine continues at step 66 to check the parent. A test is then performed at step 68 to determine if the value has been found. If the outcome of the test at step 68 is positive, a test is performed at step 70 to determine whether the propagation flag is TRUE. If so, that value is kept at step 72 (and the routine continues at step 76). If the propagation flag is FALSE, then processing returns to step 66. At step 76, a test is performed to determine whether both an owner and an ACL value have been found. If so, the routine terminates. If, however, the outcome of the test at step 76 is negative, the routine returns to step 66 and continues recursively. If the top of the tree (the suffix) has been reached with no propagating value found, then the system defaults are returned. These are found by search on the eid of −1.

As previously noted, processing efficiency is enhanced significantly through use of the source table 49. The ACL source table (src) preferably contains one row per directory object and keeps track of the exact location of the object's ACL information and owner information. This allows for fast lookup of the ACL and removes the cost of traversing the tree in reverse as described above in connection with FIG. 6. This table is created at startup time and initialized to show that the system default is set at an id of −1, an otherwise invalid LDAP/DB2 uid. A representative initialized source table is set forth below:

SOURCE TABLE

| Object (uid) | Object ID (Ancestor ID) | Object ID (Owner Source) |
| --- | --- | --- |
| −1 | −1 | −1 |

Because replication adds a cn=localhost entry to the database, an additional row of(2, −1, −1) will be added during startup.

Retrieval:

As noted above, for each object it is possible to determine the entry owner and ACL using the source table in conjunction with the other ACL tables. In particular, if an object uid appears in the ACL source column, there is a corresponding entry in the ACL propagate (acd) and class permissions table (cpt). Similarly, for each uid in the owner source column, there exists a corresponding row in the owner table (own). Thus, a single query may be used to retrieve the entire set of owner and ACL information. This query, for example, may be: "SELECT own.prp, ioc, own.din, own.dtp, acil.prp, cpt,din, cpt.dtp, atc, pma, own.uid, cpt,uid FROM own, cpt, acl, src WHERE src.uid=? AND (own.uid=src.osr AND (acl.uid=src.asr AND cpt.uid=src.asr))". This query retrieves the owner information from the owner table (corresponding to the owner source value) and similarly retrieves the ACL entry and propagation information from the propagation and permissions tables (corresponding to the ACL source column value).

Updating the Source Table:

When performing add, delete, and modify operations on the database, it may be necessary to update the source table. Every time an object is added to the directory, preferably a row is inserted into the source table. After the correct owner source and ACL source values have been identified, a row may be added by using the query "INSERT into src (uid, osr, asr,) VALUES (?, ?, ?)". Thus, taking the example illustrated above, if the source table is updated to include the entry with uid 3 that has been added to the ACL and owner tables, the source table looks as follows:

SOURCE TABLE

| Object (uid) | Object ID (Ancestor ID) | Object ID (Owner Source) |
| --- | --- | --- |
| −1 | −1 | −1 |
| 2 | −1 | −1 |
| 3 | 3 | 3 |

Every time an object is deleted, the row preferably is removed using the query "DELETE FROM src WHERE uid=?".

The more complicated operations are the modify operations. This set of operations encompasses all changes to the ACL attributes, including adding and deleting. When an ACL is added or deleted, it may change the propagation of the existing ACLs. Therefore, descendants of this node may need to be updated to reflect a new source value. This is also the case if the propagation of an ACL or owner changes.

There are three basic queries that may be used to update the source table. By substituting different values into the 'WHERE asr=?' expression, all updates may be handled using these three queries. These queries are set forth below:

A query to update a row: "UPDATE src SET asr=? WHERE asr=? AND src.uid in (SELECT DEID FROM ldap_desc WHERE AEID=? AND AEID==DEID)".

A query to update a row and some set of its descendants: "UPDATE src SET asr=? WHERE asr=? AND src.uid in (SELECT DEID FROM ldap_desc WHERE AEID=? AND AEID=?)".

A query to update just some set of descendants: "UPDATE src SET asr=? WHERE asr=? AND src.uid in (SELECT DEID FROM ldap_desc WHERE AEID=? AND AEID <>DEID)".

Additional Source Table details:

The queries involved in updating this table affect only one column at a time: the ACL source or owner source. Therefore, the same queries can be used for either ACL updates or owner updates. The following discussion describes the case of an ACL update with the understanding that the same logic can be used for owner updates.

Initially, the following details how the source table is kept in synchronization as ACLs are added to the directory and the cases where their propagation values are changed. Assume that the source table currently looks as follows:

SOURCE TABLE

| Object (uid) | Object ID (Ancestor ID) | Object ID (Owner Source) |
| --- | --- | --- |
| −1 | −1 | −1 |
| 2 | −1 | −1 |
| 3 | 3 | 3 |
| 4 | 3 | 3 |
| 5 | 3 | 3 |
| 6 | 3 | 3 |
| 7 | 3 | 3 |

SOURCE TABLE-continued

| Object (uid) | Object ID (Ancestor ID) | Object ID (Owner Source) |
|---|---|---|
| 8 | 3 | 3 |
| 9 | 3 | 3 |

A hierarchical directory tree corresponding to this table is set forth in FIG. 7. From this table, it can be seen that a propagating ACL has been set on 3.

Adding a non Propagating ACL:

If a non-propagating ACL is added, the update is straightforward. A single row is changed, namely, the row corresponding to the entry ID. The following query may be used for this purpose: "UPDATE src SET asr=? WHERE asr=? AND src.uid in (SELECT DEID FROM ldap_desc WHERE AEID=? AND AEID=DEID)". The ldap_desc table keeps track of the ancestor, and descendant value pairs. AEID is the ancestor and DEID is the descendant. For AEID=DEID, it is assured that a single entry will be returned for a given value of AEID.

Thus, for example, to add non-propagating ACL on entry 5, the following query is used: "UPDATE src SET asr=5 WHERE asr=3 AND src.uid in (SELECT DEID FROM ldap_desc WHERE AEID=5 AND AEID=DEID)". The source table now looks as follows:

SOURCE TABLE

| Object (uid) | Object ID (Ancestor ID) | Object ID (Owner Source) |
|---|---|---|
| -1 | -1 | -1 |
| 2 | -1 | -1 |
| 3 | 3 | 3 |
| 4 | 3 | 3 |
| 5 | 5 | 3 |
| 6 | 3 | 3 |
| 7 | 3 | 3 |
| 8 | 3 | 3 |
| 9 | 3 | 3 |

Adding a Propagating ACL:

The following query may be used to add a propagating ACL to a given entry: "UPDATE src SET asr=? WHERE asr=? AND src.uid in (SELECT DEED FROM ldap_desc WHERE AEID=?)". If one adds a propagating ACL to entry 4 (by way of example), the source for entry 4 and all of its descendants must be changed. The particular query is then: "UPDATE src SET asr=4 WHERE asr=3 AND src.uid in (SELECT DEID FROM ldap_desc WHERE AEID=4)". The select statement obtains all of the descendants of uid 4 (in this case objects 8 and 9). Now, taking those descendants, the query finds all of the entries that used to inherit from the same value as id 4 (both 8 and 9). These entries are the candidates for inheriting the new propagated ACL placed on object with uid 4. Additionally, a propagating ACL is placed on leaf 7. Since 7 is a leaf node, no other nodes have a source change. With this query, the representative source table now looks as follows:

SOURCE TABLE

| Object (uid) | Object ID (Ancestor ID) | Object ID (Owner Source) |
|---|---|---|
| -1 | -1 | -1 |
| 2 | -1 | -1 |
| 3 | 3 | 3 |
| 4 | 4 | 3 |
| 5 | 5 | 3 |
| 6 | 3 | 3 |
| 7 | 7 | 3 |
| 8 | 4 | 3 |
| 9 | 4 | 3 |

Changing from Propagating—→Non Propagating:

To change an ACL from propagating to non-propagating, any values which used to inherit from this node must be changed to a different node. The following query may be used for this purpose: "UPDATE src SET asr=? WHERE asr=? AND src.uid in (SELECT DEED FROM ldap_desc WHERE AEID=? AND AEID < > DEID )". Thus, for example, to change the propagating value at entry 3 to non propagating, the next ancestral propagating ACL must be determined. In the above example, this happens to be the system default as there is no ancestor node with a propagating ACL. Note also that the query changes any children who used to inherit their values from the node without changing the actual node itself Given this example, the query reads: "UPDATE src SET asr=-1 WHERE asr=3 AND src.uid in (SELECT DEID FROM ldap_desc WHERE AEID=3 AND AEID < > DEID)". The select statement returns all the descendants of entry 3 without returning entry 3 itself. The WHERE clause then filters out all objects that were not previously inheriting from entry 3. The illustrative source table now looks as follows:

SOURCE TABLE

| Object (uid) | Object ID (Ancestor ID) | Object ID (Owner Source) |
|---|---|---|
| -1 | -1 | -1 |
| 2 | -1 | -1 |
| 3 | 3 | 3 |
| 4 | 4 | 3 |
| 5 | 5 | 3 |
| 6 | -1 | 3 |
| 7 | 7 | 3 |
| 8 | 4 | 3 |
| 9 | 4 | 3 |

Changing from Non Propagating—→Propagating:

To change a non-propagating ACL to a propagating ACL, the first propagating ACL ancestor for this node is identified. Thus, for example, to change object 5 from a non propagating to a propagating ACL, the tree is traversed in reverse and the first propagating ACL is the system default (—1). From this point, the query that updates descendants is preferably used (although the query that updates a node and its descendants works as well). The illustrative query therefore reads: "UPDATE arc SET asr=5 WHERE asr=-1 AND src.uid in (SELECT DEID FROM ldap_desc WHERE AEID=5 AND AEID < > DEID)." The select statement returns values that currently inherit from (—1) and these values are both updated to inherit from object 5. It should be noted that the scope of a propagating ACL is only until another propagating ACL is reached. Thus, in the illustrative example, because object 7 has a propagating ACL, the scope of the ACL placed on object 5 stops once object 7 is reached.

The source table now looks as follows:

SOURCE TABLE

| Object (uid) | Object ID (Ancestor ID) | Object ID (Owner Source) |
| --- | --- | --- |
| −1 | −1 | −1 |
| 2 | −1 | −1 |
| 3 | 3 | 3 |
| 4 | 4 | 3 |
| 5 | 5 | 3 |
| 6 | 5 | 3 |
| 7 | 7 | 3 |
| 8 | 4 | 3 |
| 9 | 4 | 3 |

Deleting a Propagating ACL:

To delete a propagating ACL, the first step is to find the first ancestral propagating ACL. This is the value from which inheritance then occurs. For object 4, for example, the system default (—1) is the first ancestral propagating ACL. To update the node and its descendants, the following query is used: "UPDATE src SET asr=? WHERE asr=? AND src.uid in (SELECT DEID FROM ldap_desc WHERE AEID=?)". With the appropriate values filled in, the query becomes: "UPDATE src SET asr=−1 WHERE asr=4 AND src.uid in (SELECT DEID FROM ldap desc WHERE AEID=4)". The select statement obtains all the descendants of uid 4 (in this case objects 8 and 9). Within those descendants, the query then find all of the entries that used to inherit from the same value as id 4 (both 8 and 9). These values then are changed to inherit from the system default. The source table then looks as follows:

SOURCE TABLE

| Object (uid) | Object ID (Ancestor ID) | Object ID (Owner Source) |
| --- | --- | --- |
| −1 | −1 | −1 |
| 2 | −1 | −1 |
| 3 | 3 | 3 |
| 4 | −1 | 3 |
| 5 | 5 | 3 |
| 6 | 5 | 3 |
| 7 | 7 | 3 |
| 8 | −1 | 3 |
| 9 | −1 | 3 |

Deleting a Non Propagating ACL:

To delete a non-propagating ACL, the source for that particular object is updated. First, the new ACL source is found. Thus, for example, for object 3, there is no parent, so the system default is used (—1). The appropriate query reads: "UPDATE src SET asr=−1 WHERE asr=3 AND src.uid in (SELECT DEID FROM ldap_desc WHERE AEID=3 AND AEID=DEID)". The resulting source table is then as follows:

SOURCE TABLE

| Object (uid) | Object ID (Ancestor ID) | Object ID (Owner Source) |
| --- | --- | --- |
| −1 | −1 | −1 |
| 2 | −1 | −1 |
| 3 | −1 | 3 |
| 4 | −1 | 3 |
| 5 | 5 | 3 |
| 6 | 5 | 3 |
| 7 | 7 | 3 |
| 8 | −1 | 3 |
| 9 | −1 | 3 |

One of ordinary skill in the art will appreciate that the designation of a "first" (or other number) as describing a given table is merely provided for convenience of illustration. Preferably, the first, second, third and fourth tables are conceptually distinct, but they may or may not be physically distinct. Thus, for example, the individual tables may simply comprise different addressable portions of the same physical memory of other storage area. Moreover, the storage of ACL information as described herein can be used as a model for storage of any model requiring sparse data (and not just ACL data).

As noted above, the invention may be implemented in conjunction with a sparse ACL mechanism in any hierarchical directory service in which a relational database management system (RDBMS) is used to provide a backing store function. A preferred implementation is LDAP running a DB/2 relational database as the backing store. As is well known, an SQL query is generated and used to access the relational database, and results are then returned in response to this query.

A preferred implementation of table generation and storage routines is as a computer program and, in particular, as a set of instructions (computer program code) in a code module resident in or downloadable to the random access memory of a computer.

Having thus described our invention, what we claim as new and desire to secure by letters patent is set forth in the following claims:

What is claimed is:

1. A relational database, comprising:
   a first table storing data on objects with explicitly set ACLs;
   a second table storing data on whether individual ACLs art inherited by descendant objects;
   a third table storing data regarding permissions which a user may perform on an object; and
   a fourth table storing data for a set of ancestor objects having respective ACLs for each of a set of descendant objects.

2. A computer program product in a computer-readable medium for use in a sparse access control list (ACL) mechanism wherein entries without an explicitly set ACL inherit an ACL set for an ancestor entry, comprising;
   means for storing in a first table data on objects with explicitly set ACLs,
   means for storing in a second table data on whether individual ACLs are inherited by descendant objects;
   means for storing in a third table data regarding permissions which a user may perform on an object;
   means for storing in a fourth table data for a set of ancestor objects having respective ACLs for each of a set of descendant objects; and
   means for using data in the first, second, third and fourth tables for a given object, to determine the given object's entry owner and ACL.

3. In a sparse access control list (ACL) mechanism wherein entries without an explicitly set ACL inherit ACL set for an ancestor entry, a method for securing ACL data in a relational database, comprising the steps of;
   storing in a first table data on objects with explicitly set ACLs:
   storing in a second table data on whether individual ACLs are inherited by descendant objects;
   storing in a first table data regarding permissions which a user may perform on an object;
   storing in a fourth table data for a set of ancestor objects having respective ACLs for each of a set of descendant objects; and for a given object, using data in the first, second, third and fourth tables to determine the given object's entry owner and ACL.

4. The method as described in claim 3 wherein the first, second, third and fourth tables are stored in the relational database together with the objects.

5. The method as described in claim 4 wherein the given object's entry owner is determined by using owner source data in the fourth table and locating corresponding owner information in the first table.

6. The method as described in claim 3 wherein the given entry's ACL is determined by using ACL source data in the fourth table and locating corresponding ACL propagation and entry information in the second and third tables.

7. The method as described in claim 3 wherein the relational database is used as a backing store for a Lightweight Directory Access Protocol (LEAP) directory service.

8. The method as described in claim 3 wherein the relational database is DB/2.

9. In a directory service having a directory organized as a naming hierarchy, the hierarchy including a plurality of entries each represented by a unique identifier, the improvement comprising:
- a relational database management system having a backing store for storing directory data;
- a sparse access control list (ACL) mechanism wherein entries without an explicitly set ACL inherit and ACL set for an ancestor entry; and
- means for securing ACL data in the backing store in a plurality of tables, including:
  - a first table storing data on objects with explicitly set ACLs;
  - a second table storing data on whether individual ACLs are inherited by descendent objects;
  - a third table storing data regarding permissions which a user may perform on an object; and
  - a fourth table storing data for a set of ancestor objects having respective ACLs for each of a set of descendent objects, wherein, for a given object, data in the first, second, third and fourth tables is useful for determining the given object's entry owner and ACL.

10. In the directory service as described in claim 9 wherein the directory is compliant with the Lightweight Directory Access Protocol (LDAP).

11. In the directory service as described in claim 10 wherein the relational database management system is DB/2.

12. A directory service, comprising:
- a directory organized as a naming hierarchy having a plurality of entries each represented by a unique identifier;
- a relational database management system having a backing store for storing directory data; a sparse access control list (ACL) mechanism wherein entries without an explicitly set ACL inherent and ACL set for an ancestor entry; and
- means for securing ACL data in the backing store in a plurality of tables, including:
  - a first table storing data on objects with explicitly set ACLs;
  - a second table storing data on whether individual ACLs are inherited by descendant objects;
  - a third table storing data permissions which a user may perform on an object; and
  - a fourth table storing data for a set of ancestor objects having respective ACLs for each of a set of descendent objects, wherein, for a given object, data in the first, second, third and fourth tables is useful for determining the given object's entry owner and ACL.

13. The directory service as described in claim 12 wherein the directory is compliant with the Lightweight Directory Access Protocol (LDAP).

14. The directory service as described in claim 12 wherein the relational database management system is DB/2.

* * * * *

UNITED STATES PATENT AND TRADEMARK OFFICE
CERTIFICATE OF CORRECTION

| | | |
|---|---|---|
| PATENT NO. | : 6,438,549 B1 | Page 1 of 1 |
| DATED | : August 20, 2002 | |
| INVENTOR(S) | : Barry Keith Aldred, Debora Jean Byrne, Shaw-Ben Shi and Ellen J. Stokes | |

It is certified that error appears in the above-identified patent and that said Letters Patent is hereby corrected as shown below:

<u>Column 14,</u>
Line 25, please replace "letters patent" with -- Letters Patent --
Line 62, please replace "first" with -- third --.

Signed and Sealed this

Seventh Day of January, 2003

JAMES E. ROGAN
*Director of the United States Patent and Trademark Office*